United States Patent

Yoshida et al.

[11] Patent Number: 5,332,019
[45] Date of Patent: Jul. 26, 1994

[54] PNEUMATIC TIRE HAVING A RIM INTERFACING BEAD PROFILE FOR IMPROVED FIT

[75] Inventors: Masanao Yoshida, Akashi; Yoshiaki Uemura, Kobe, both of Japan

[73] Assignee: Sumitomo Rubber Industries, Ltd, Kobe, Japan

[21] Appl. No.: 19,448

[22] Filed: Feb. 18, 1993

[30] Foreign Application Priority Data

Feb. 21, 1992 [JP] Japan ............................... 4-072615

[51] Int. Cl.$^5$ ............................................. B60C 15/024
[52] U.S. Cl. ........................................ 152/544; 152/539
[58] Field of Search ........................ 152/544, 454, 539

[56] References Cited

U.S. PATENT DOCUMENTS 5,107,915  4/1992  Shimomura et al. ................ 152/544

FOREIGN PATENT DOCUMENTS 0129675  1/1985  European Pat. Off. .
2747009  4/1979  Fed. Rep. of Germany ...... 152/544
3616199 11/1987  Fed. Rep. of Germany .
70710    5/1982  Japan ................................. 152/544

OTHER PUBLICATIONS

Patent Abstracts of Japan vol. 7, No. 79 (M-204)(1224) Mar. 31 1983 for JP-A-58 004 607 (Bridgestone Tire K.K.) Nov. 1 1983, abstract only, *Pneumatic Tire of High Resistance to wear on Rim, for Heavy Load*.

*Primary Examiner*—Geoffrey L. Knable

[57] ABSTRACT

A pneumatic tire, in which, in a cross section including the tire axis, the bead profile is made of a curved line between a locus of $$y = f(x) + 1 \text{ mm}$$

and a locus of $$y = f(x) - 1 \text{ mm}$$

which are made when x-value is varied from $-15.29$ to 0.523, wherein $$f(x) = 3.789 + 2.4273x + 0.73024x^2 + 0.12736x^3 + 0.012774x^4 + 6.659 \times 10^{-4}x^5 + 1.36 \times 10^{-5}x^6$$

x is a variable indicating a relative radial distance in millimeter based on a reference point, defining the direction of increase of the x-value as being radially inward of the tire, and y is a variable indicating a relative axial distance in millimeter based on a reference point, defining the direction of increase of the y-value as being axially inward of the tire.

6 Claims, 3 Drawing Sheets

PNEUMATIC TIRE HAVING A RIM INTERFACING BEAD PROFILE FOR IMPROVED FIT

The present invention relates to a pneumatic tire, more particularly a tubeless radial tire for passenger cars whose nominal tire width in the tire size designation is in the range of 135 to 275 millimeter.

BACKGROUND OF THE INVENTION

In general, tubeless radial tires to be mounted on tapered rims are widely used for passenger cars. It is well known that a contact between the tire and rim is a very important factor with respect to the airtightness therebetween.

However, the actual contacting state of the bead portions of a tire with the flange and bead-seat of the rim was not known until the advent of a X-ray CT scanner.

On the other hand, a slip between a tire and rim in the circumferential direction of the tire was often observed when a passenger car made a quick start, a sudden stop and the like, which became remarkable according to the recent increase in engine power and high speed running.

In order to avoid such a slip, the profile of bead portions of a tire has been designed such that the profile of a regular rim for the tire are partially somewhat overlapped with the bead profile, and the overlapped part is arranged in a portion corresponding to the radially outer edge portion of the rim flange. Accordingly, the contact pressure is increased in the overlapped part.

By this method, the slip was prevented, and the airtightness was not lost. However, RRO (Radial Runout) and FV (Force Variation) increased.

Therefore, using a X-ray CT scanner, the inventors made a study of the increase in RRO and FV, and as a result, as shown in FIG. 3, it was revealed that although the bead bottom face (b) contacts the rim (c) airtightly, a gap (g) was formed between the side face (f) of the bead portion (a) and the axially inner surface of the rim flange (e), and as a result, the tire was disturbed in its position and profile to increase RRO and FV.

SUMMARY OF THE INVENTION

It is therefore, an object of the present invention to provide a pneumatic tire, in which the contact of the bead portions with its regular rim is improved.

According to one aspect of the invention, a pneumatic tire comprises
a pair of axially spaced bead portions with a bead profile,
a tread portion with axial edges, and
a pair of sidewall portions extending from the tread edges to the bead portions,
in a cross section including the tire axis, the bead profile of each bead portion being within a range between a locus of $$y = f(x) + 1 \text{ mm}$$

and a locus of $$y = f(x) - 1 \text{ mm}$$

which are made when x-value is varied from $-15.29$ to $0.523$ (mm), wherein $$f(x) = 3.789 + 2.4273x + 0.73024x^2 + 0.12736x^3 + 0.012774x^4 + 6.659 \times 10^{-4}x^5 + 1.36 \times 10^{-5}x^6$$

f(x) is a function of x,
x is a variable indicating a relative radial distance in millimeter based on a reference point, defining the direction of increase of the x-value as being radially inward of the tire, and
y is a variable indicating a relative axial distance in millimeter based on a reference point, defining the direction of increase of the y-value as being axially inward of the tire.

Accordingly, the bead profile comprises
a middle part (C-D) made of a substantially straight line being parallel to the radial direction of the tire,
an upper part (A-C) made of a concavely curved line extending radially outwardly and axially outwardly from the radially outer edge of the middle part,
a heel part (D-E) made of a convexly curved line extending radially inwardly and axially inwardly from the radially inner edge of the middle part, and
a bottom part (B-E) made of a substantially straight line extending axially inwardly from the radially inner edge of the heel part with an inclination angle of five degrees to the tire axial direction.

The above-mentioned reference points are the origins of the x-axis of coordinate and y-axis of coordinate, and the reference points can set at the same bead-heel-point, that is, an intersecting point between the straight bead bottom line being inclined at five degrees to the tire axial direction and the straight bead side line being parallel to the tire radial direction.

BRIEF DESCRIPTION OF THE FIGURES

An embodiment of the present invention will now be described in detail in conjunction with the accompanying drawings.

DETAILED DESCRIPTION OF THE INVENTION

Figure 1:
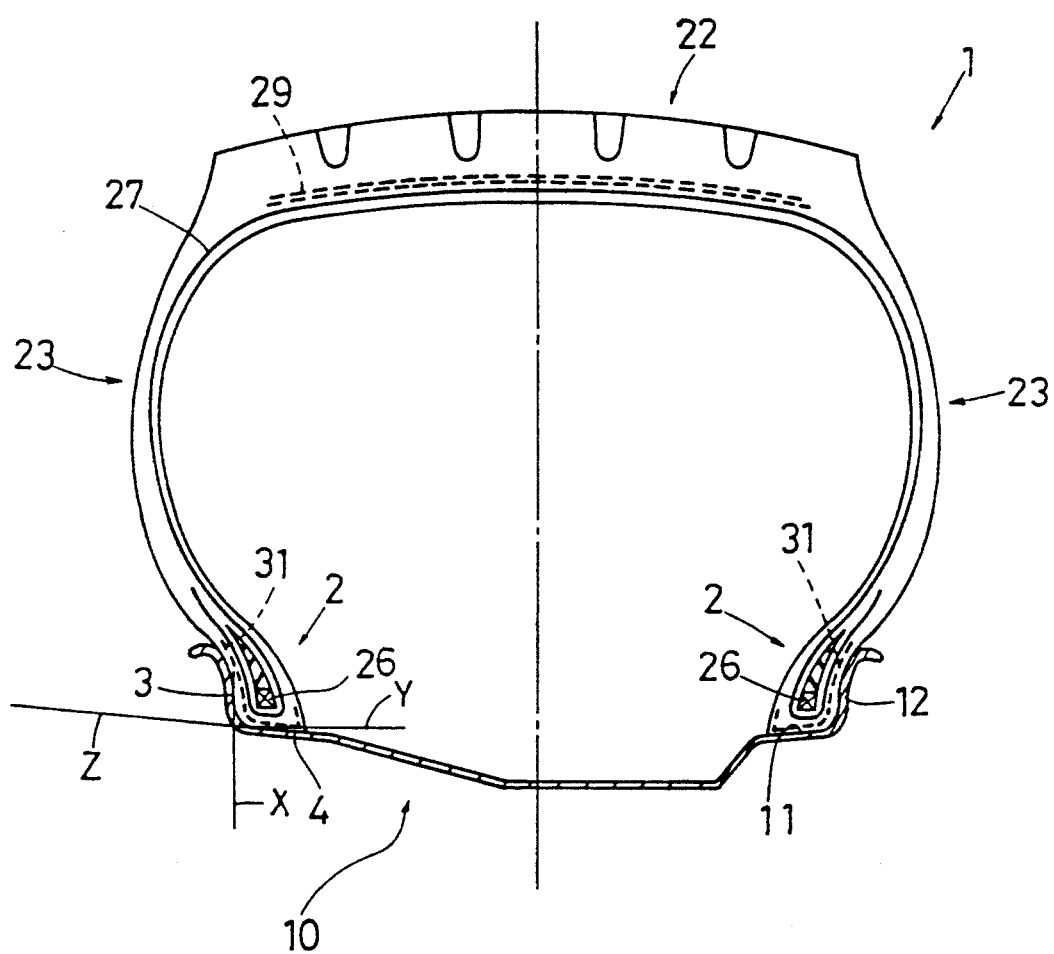
FIG. 1 is a cross sectional view of a tire of the present invention showing a state of the tire mounted on its regular rim.

In FIG. 1, a pneumatic tire 1 of the invention is a passenger tire of 205/85R15 in metric size. The tire is mounted on its regular rim 10 of size 6 1/2JJx15 and inflated to its regular inner pressure. Here, a regular rim is the rim officially approved for the tire by, for example JATMA (Japan), TRA (USA), ETRTO (Europe) and the like.

The tire 1 comprises a tread portion 22, a pair of axially spaced bead portions 2 with a bead core therein, a pair of sidewall portions 22 extending radially inwardly from the tread edges to the bead portions, a toroidal carcass 27 extending between the bead portions 2, and a belt 29 disposed radially outside the carcass and the tread portion The carcass 27 comprises at least one ply of cords arranged radially at 80 to 90 degrees with respect to the tire equator C extending between the bead portions 2 and turned up around the bead cores to have a radial or so called semiradial structure.

For the carcass cords, organic fiber cords, e.g. nylon, polyester, rayon, aromatic polyamide and the like are used.

The belt 29 comprises a plurality of plies of cords inclined so that the cords of one ply cross the cords of the next ply.

For the belt cords, steel cords and organic fiber cords, e.g. nylon, polyester, rayon, aromatic polyamide and the like can be used.

In this embodiment, to increase the bead rigidity, the bead portion 2 is provided with a reinforcing layer 31 to wrap the carcass 27. The reinforcing layer 31 is made of cords laid crosswise to the carcass cords.

For the reinforcing cords, steel cords, strong organic fiber cords, e.g. aromatic polyamide fiber cords, and the like are used.

Incidentally, a regular rim or an approved rim for a tubeless radial tire for passenger cars whose nominal tire width in the tire size designation is in the range of 135 to 275 millimeter, is a center dropped rim, which comprises a central well for tire mounting, a pair of axially spaced bead seats for the bead portions 2, each located on each side of the central well, and a pair of flanges each extending radially outwardly from the axially outer edge of each bead seat. The bead seats are tapered at five degrees toward the center.

Figure 2:
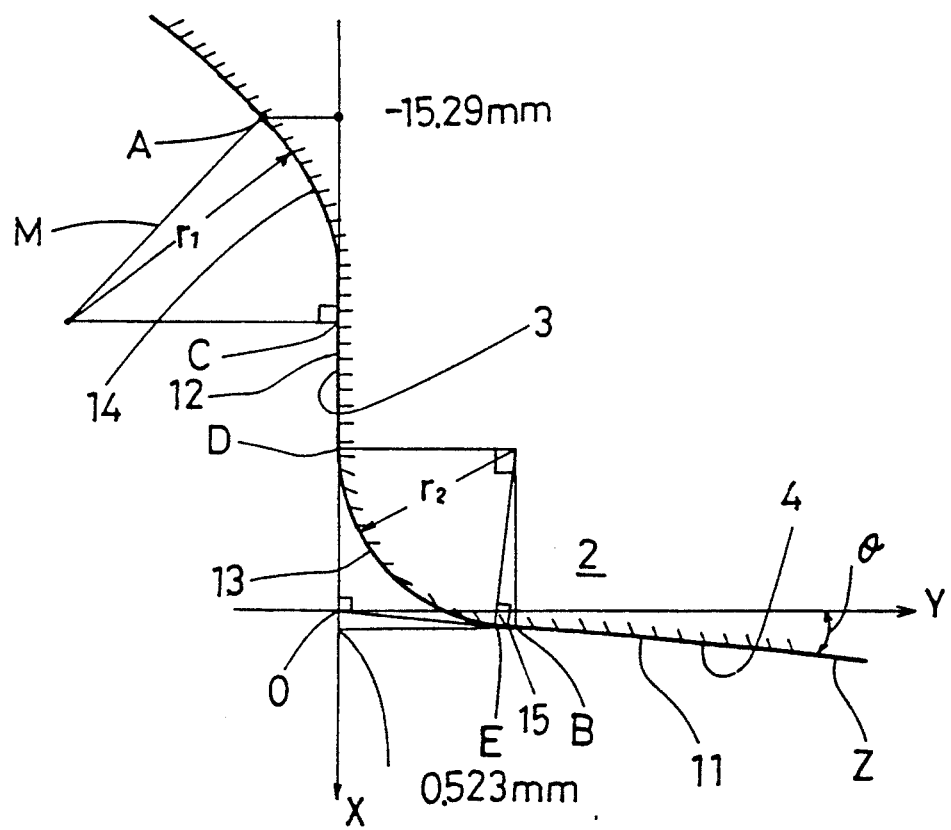
FIG. 2 is an enlarged schematic cross sectional view of the bead portion explaining the bead profile.
Figure 3:
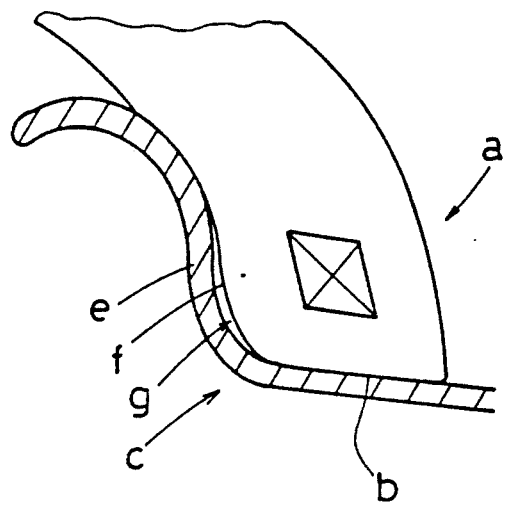
FIG. 3 is a schematic cross sectional view explaining the problem of gap between the tire bead and rim.

Each of the bead portions 2 is provided with a bead profile as shown in FIG. 2.

The bead profile comprises an upper part 14 extending from a point A to a point a middle part 12 extending from the point C to a point D, a heel part 13 extending from the point D to a point E, a bottom part 15 extending from the point E to a point B, and an extended part 11 extending from the point B to the bead toe.

The bead profile between the point A and the point B is defined by the locus of a specific equation (1). As a result, in a cross section including the tire axis, the middle part 12 is made of a substantially straight line being parallel to the radial direction of the tire; the upper part 14 is made of a concavely curved line extending radially outwardly and axially outwardly from the radially outer edge of the middle part 12; the heel part 13 is made of a convexly curved line extending radially inwardly and axially inwardly from the radially inner edge of the middle part 12; and the bottom part 15 is made of a substantially straight line extending axially inwardly from the radially inner edge of the heel part with an inclination angle of five degrees to the tire axial direction.

The upper part 14 resembles an arc having a radius of curvature (r1) of 9.25 mm, and the heel part resembles an arc having a radius of curvature (r2) of 6.0 mm.

The extended part 11 is made of a straight line extending from the point B at five degrees, the same inclination angle as the bottom part.

The above-mentioned equation (1) is $$y = f(x) \qquad \text{Eq. (1)}$$

wherein $$f(x) = 3.789 + 2.4273x + 0.73024x^2 + 0.12736x^3 + 0.012774x^4 + 6.659 \times 10^{-4}x^5 + 1.36 \times 10^{-5}x^6$$

x is a variable indicating a relative radical distance in millimeter based on a reference point, defining the direction of increase of the x-value as being radially inward of the tire, and y is a variable indicating a relative axial distance in millimeter based on the above-mentioned reference point, defining the direction of increase of the y-value as being axially inward of the tire.

This equation (1) is established based on that the reference point is set at the bead-heel-point, that is, an intersecting point between the straight bead bottom line being inclined at five degrees to the tire axial direction and the straight bead side line being parallel to the tire radial direction. Therefore, the x-value is varied from $-15.29$ to $0.523$ in the equation (1) because the x-values for the point A and point B are $-15.29$ and $0.523$, respectively.

Incidentally, the x-values for the above-mentioned point C, point D and point E are $-8.75$, $-5.5$, and $0,477$, respectively.

As explained above, the equation (1) is based on the bead-heel-point, for convenience, because such a bead-heel-point is well known as a reference point for determining the rim diameter.

If the reference point is set at a different point, the equation (1) should be modified.

For example, if the reference point is set at plus (dy) millimeter axially inward of the bead-heel-point, (y) is replaced by (y+dy).

Further, if the reference point is set at plus (dx) millimeter radially inward of the bead-heel-point, (x) is replaced by (x+dx) as shown as equation (2), $$y+dy=f(x+dx) \qquad \text{Eq.(2)}$$

and the above-mentioned range of from $-15.29$ to $0.523$ is changed to as being from $(-15.29-dx)$ to $(0.525-dx)$.

Accordingly, $$(y + dy) = 3.789 + 2.4273(x + dx) + 0.73024(x + dx)^2 + 0.12736(x + dx)^3 + 0.012774(x + dx)^4 + 6.659 \times 10^{-4}(x + dx)^5 + 1.36 \times 10^{-5}(x + dx)^6$$

Figure 4:
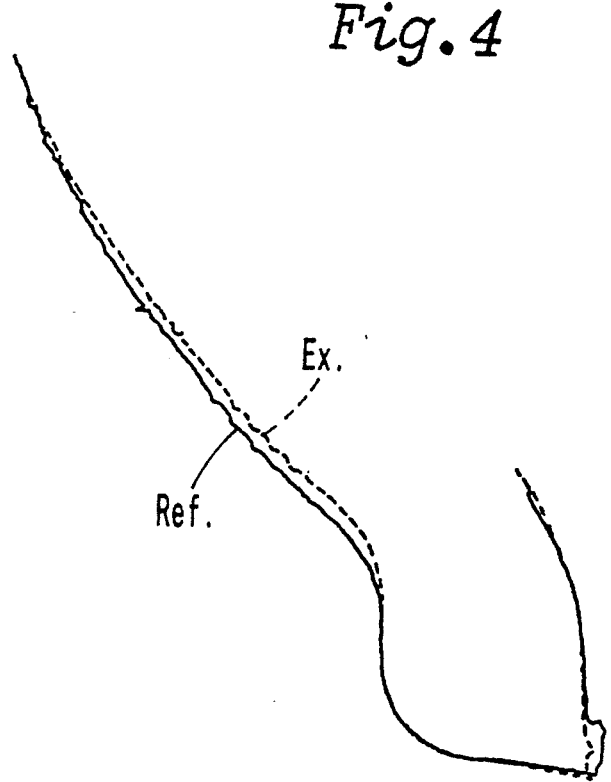
FIG. 4 is a cross sectional view showing the bead profile according to the present invention and the conventional bead profile.

Example tire of size 205/65R15 having a bead profile defined by the equation (1) was experimentally made. Reference tire having a bead profile according to a prior art was also prepared. Those bead profiles are shown in FIG. 4. The test tires had an identical structure with the exception of the bead profiles.

The test tire was mounted on a regular rim of 6 1/2JJX15 and inflated to a normal pressure in JATMA's standard. Then, using an X-ray CT scanner, the bead portion was inspected for a gap between the bead and the rim. The results are as follows:

| Circumferential position | Ex. gap (mm) | Ref. gap (mm) |
| --- | --- | --- |
| 1 | 0 | 0.50 |
| 2 | 0 | 0.42 |
| 3 | 0 | 0.56 |
| 4 | 0 | 0.28 |
| Average | 0 | 0.44 |

From the tests, it was confirmed that the bead portion having the bead profile according to the equation (1) can fit on the regular rim without any gap, which was also confirmed in a combination of a tire of another size and its regular rim.

It was further confirmed that no gap is formed when the y-value has a small variation. Such a variation is plus/minus one millimeter, more preferably plus/minus 0.5 millimeter.

Therefore, including the allowable variation, the above-mentioned equation (1) is modified as follows:

$$y = f(x) + \text{Variation} \qquad \text{Eq.(2)}$$

Similarly, the equation (2) is modified as follows:

$$y + dy = f(x + dx) + \text{Variation} \qquad \text{Eq.(4)}$$

Here, the Variation is plus/minus one ($\pm 1$, that is, from $-1$ to 1), more preferably $\pm 0.5$.

As explained as above, by satisfying the former equations (1) or (2) by the bead profile, the tire bead portion can fit on the rim flange's inner surface without any gap therebetween.

Further, by satisfying the later equations (3) or (4) by the bead profile, the applicability of the invention is further extended from the JATMA standard to another standard such as of TRA (USA), ETRTO (Europe) and the like. In any way, the present invention is applied to a tubeless radial tire for passenger cars whose nominal tire width in the tire size designation is in the range of 135 to 275 millimeter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pneumatic tire, whose nominal tire width in the tire size designation is in the range of 135 to 275 millimeters, for mounting on a rim comprising
   a pair of axially spaced bead portions, each of said pair of bead portions having, in cross section including the tire axis, a bead profile, said bead profile interfacing with the rim,
   a tread portion with axial edges, and
   a pair of sidewall portions extending from the tread edges to the bead portions,
   said bead profile including a curved line being within a range between a locus of $$Y = f(x) + 1 \; mm$$

and a locus of $$y = f(x) - 1 \; mm$$

which are made when x-value is varied from $-15.29$ to $0.523$ mm, wherein $$f(x) = 3.789 + 2.4273x + 0.73024x^2 + 0.12736x^3 + 0.012774x^4 + 6.659 \times 10^{-4}x^5 + 1.36 \times 10^{-5}x^6$$

f(x) is a function of x,
   x is a variable indicating a relative radial distance in millimeter based on a reference point, said reference point being set at the heel point of each said bead portion, defining the direction of increase of the x-value as being radially inward of the tire, and
   y is a variable indicating a relative axial distance in millimeter based on said reference point, defining the direction of increase of the y-value as being axially inward of the tire, wherein
   the heel point is an intersecting point between the straight bead bottom line being inclined at five degrees to the tire axial direction and the straight bead side line being parallel to the tire radial direction.

2. The pneumatic tire according to claim 1, wherein said bead profile is within a range between a locus of $$y = f(x) + 0.5 \; mm$$

and a locus of $$y = f(x) - 0.5 \; mm$$

which are made when x-value is varied from $-15.29$ to $0.523$.

3. The pneumatic tire according to claim 1, wherein said bead profile is substantially the same as a locus of $$y = f(x)$$

which is made when x-value is varied from $-15.29$ to $0.5232$.

4. The pneumatic tire according to claim 1 wherein said bead profile is defined by a middle part (12) made of a substantially straight line being parallel to the radial direction of the tire,
   an upper part (14) made of a concavely curved line extending radially outwardly and axially outwardly from the radially outer edge (C) of the middle part (12), a heel part (13) made of a convexly curved line extending radially inwardly and axially inwardly from the radially inner edge (D) of the middle part (12), and
   a bottom part (15) made of a substantially straight line extending axially inwardly from the radially inner edge (E) of the heel part (13) with an inclination angle of five degrees to the tire axial direction, and each said bead portion has a bottom surface (11) made of a straight line extending from the axially inner edge (B) of said bottom part (15) to the toe of the bead at the same inclination angle as said bottom part.

5. The pneumatic tire according to claim 2 wherein said bead profile is defined by a middle part (12) made of a substantially straight line being parallel to the radial direction of the tire,
   an upper part (14) made of a concavely curved line extending radially outwardly and axially outwardly from the radially outer edge (C) of the middle part (12), a heel part (13) made of a convexly curved line extending radially inwardly and axially inwardly from the radially inner edge (D) of the middle part (12), and
   a bottom part (15) made of a substantially straight line extending axially inwardly from the radially inner edge (E) of the heel part (13) with an inclination angle of five degrees to the tire axial direction, and each said bead portion has a bottom surface (11) made of a straight line extending from the axially inner edge (B) of said bottom part (15) to the toe of the bead at the same inclination angle as said bottom part.

6. The pneumatic tire according to claim 3 wherein said bead profile is defined by a middle part (12) made of a substantially straight line being parallel to the radial direction of the tire, an upper part (14) made of a concavely curved line extending radially outwardly and axially outwardly from the radially outer edge (C) of the middle part (12), a heel part (13) made of a convexly curved line extending radially inwardly and axially inwardly from the radially inner edge (D) of the middle part (12), and a bottom part (15) made of a substantially straight line extending axially inwardly from the radially inner edge (E) of the heel part (13) with an inclination angle of five degrees to the tire axial direction, and each said bead portion has a bottom surface (11) made of a straight line extending from the axially inner edge (B) of said bottom part (15) to the toe of the bead at the same inclination angle as said bottom part.

* * * * *